Patented Mar. 23, 1943

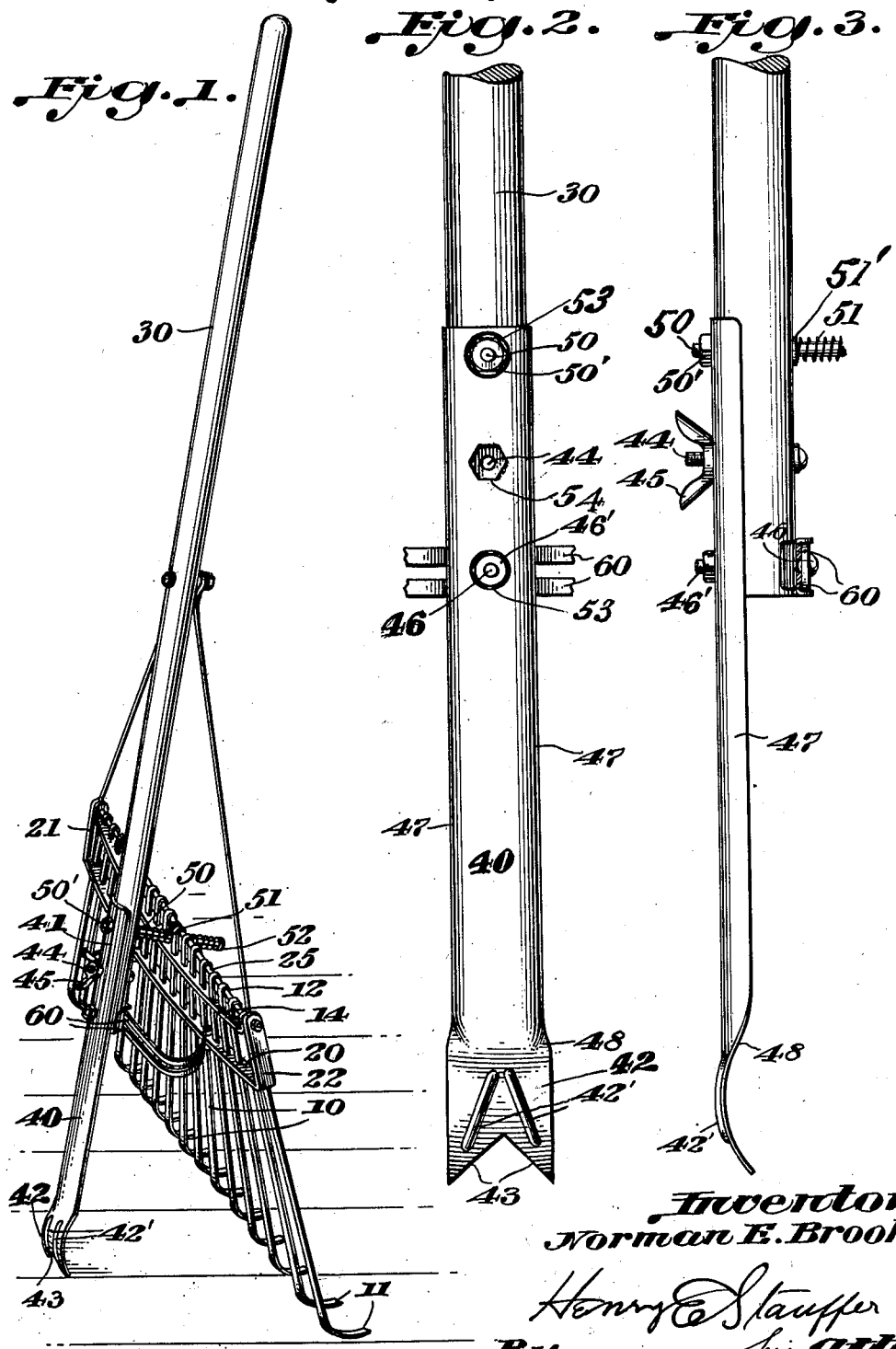

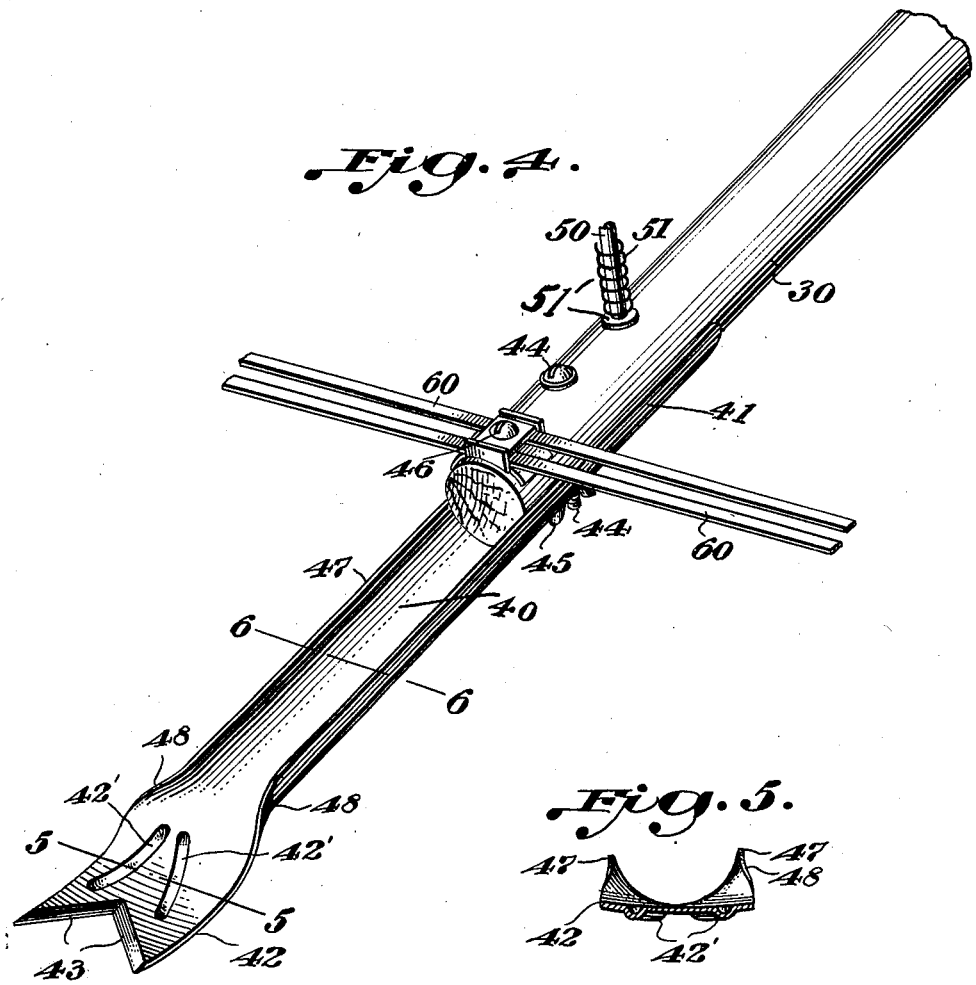

2,314,685

UNITED STATES PATENT OFFICE 2,314,685

WEED CUTTER

Norman E. Brooke, Washington, D. C.

Original application September 19, 1940, Serial No. 357,477. Divided and this application October 16, 1941, Serial No. 415,304

2 Claims. (Cl. 30—315)

This invention is in cutters designed primarily for use in removing weeds from lawns and gardens. The cutter is here shown as applied to the handle of a rake, but it is to be understood that it may be secured to a handle of its own, and constitute an independent implement or tool.

The invention has been divided from my application Serial No. 357,477, filed September 19, 1940, since matured into Patent No. 2,268,066 dated Dec. 30, 1941.

One of the objects of the invention is to provide a cutter element, the body of which will partly surround or embrace the handle, thus giving the cutter a strong lateral support.

Another object is to secure the cutter to its handle in such a way that it may be quickly and easily removed and replaced.

A further object is to produce a cutter which shall be sufficiently long to enter the ground and sever the root of the objectionable growth; but which shall be of light metal, and yet shall have great strength and stiffness.

Another object is to give the lower or cutting end of the tool a "spoon" shape, forming the same from the material which is used to strengthen the sides of the blade; and, further, to form the body of the spoon-shaped cutter so that the cutting end can be thrust into the ground and be moved beneath the surface in a path approximately parallel thereto.

In the drawings:

Fig. 1 is a perspective view of my invention applied to a rake handle, the rake also being shown;

Fig. 2 is an enlarged view of the cutter applied to its handle, part of the handle being broken away, and with the wing nut shown in Fig. 1 removed;

Fig. 3 also is an enlarged view of the cutter applied to its handle, the handle and cutter, however, being turned approximately 90° from their position in Fig. 2;

Fig. 4 is a perspective view of the under side of the cutter and handle;

Fig. 5 is a section through the cutter, taken on the line 5—5 of Fig. 4; and

Fig. 6 is a section taken on the line 6—6 of Fig. 4.

Referring to the drawings, and particularly to Fig. 1 thereof, there is shown a cutter and a handle 30 therefor, and a rake head also attached to the handle. The rake head comprises spring tines 10, having their lower portions 11 bent from the plane of the body of the rake to form gathering ends, and their opposite end portions provided with eyes 12. The tines are mounted in or supported by bridles 14 and 20, which are connected at their ends by members 21 and 22. A rod 25 passes through the eyes 12, and is secured at its ends in the bridle structure, thus holding the tines in position in the bridles. This construction is shown and described more fully in my said parent application No. 357,477, mentioned above.

The body of the rake, comprising the tines and the bridle structure, is supported at two points: at the front, by bowed springs 69, which are secured at their ends to the bridle 20, and between their ends to the handle 30, by bolt 46 and nut 46'; and at the rear, by bolt 50 and nut 50', connecting the handle 30 and the bridle 14. This rear support involves also the springs 51 and 52 and the washer 51'.

The spring supporting means, broadly speaking, is shown, described and claimed in my United States Patent No. 2,205,827; and the exact spring construction here illustrated forms the basis of certain of the claims of my aforesaid parent application No. 357,477, and is no part of the invention claimed in the present application.

The cutter proper is indicated as a whole by the character 40, and is best shown in Figs. 2, 3, and 4. It is this that constitutes the subject-matter of this application. The body of the cutter-blade is relatively long, and perhaps may be best described as being in three sections, although preferably made from a single piece of metal. This element, for special reasons is preferably made as a channel-bar of any suitable cross-section, so as to give lateral strength to the blade.

The several sections of the blade may perhaps be best described as the fastening end 41, by which the blade is secured to a suitable handle; the cutting portion 42; and the relatively long intervening or body portion.

This body is preferably in the form of a channel bar, the sides of the cutter bar being the sides of the channel bar. While the cross-section of this bar is here shown as semi-cylindrical, the shape is not of the essence of the invention, and a bar of any preferred cross-section may be used. In this case, the handle of the rake 30 is cylindrical in shape, and therefore the channel-bar, which rests over and partly embraces the handle is approximately semi-cylindrical in shape.

This form of cutter makes it practicable to have a relatively long blade so that it may reach deep into the ground, and yet have sufficient lateral strength to withstand rugged use. Therefore this is not a mere arbitrary arrangement, but the shape makes it possible to have a long blade, a blade that allows a long distance from the end of the handle to the cutter proper. Thus the blade can be forced deep into the ground without the end of the handle contacting the ground.

The cutter 40 is provided with a hexagonal opening 54, which is of a shape and size to serve as a wrench for the several nuts used in the construction of the implement. This opening 54 is of course larger than the body of the bolt 44 which passes therethrough and on which the wing nut 45 is secured to hold the cutter to the handle. Above and below the opening 54 the cutter body is provided with circular openings 53. The upper opening (Fig. 2) passes over, but rather closely surrounds, the nut 50' on the bolt 50; and the lower opening 53 passes over, and also rather closely surrounds the nut 46' on the bolt 46. Each of the openings 53 preferably engages the corners of one of the nuts 46' and 50', and thus prevent lateral movement of the cutter 40 notwithstanding the hexagonal opening 54 does not closely engage the body of the bolt 44. Thus the wing nut 45 is enabled to clamp the cutter to the handle; yet the cutter may be easily removed, merely by removing the wing nut.

The lower portion of the cutter body has its sides 47 spread out, as at 48 (Fig. 5), and the material thus spread formed into a concavo-convex cross-section both laterally and longitudinally, or to what may be termed a "spoon" shape, as at 42. Since the cutter body is not flattened completely, the strength of the channel bar is retained; but the material is flattened sufficiently so that the cutter can readily pass through the ground. The cutting portion 42 of the tool is still further strengthened by ribs 42', 42', which are struck from the body of the spoon-shaped portion.

The end 42 of the cutter body is notched as at 43, and sharpened, so that it may readily sever objectionable vegetation.

When a cutter of this type is thrust into the ground, it may be caused to move beneath the surface but substantially parallel thereto for easy cutting of the root of the objectionable growth. The severed vegetation can be removed in any desired manner.

As here shown, and as explained more fully in my application No. 357,477, above referred to, the cutter and its handle, when used with the rake, are of such relative length that the rake may be stood upon the ground by resting it upon the cutter and the ends of the tines.

I claim:

1. An elongated channel-shaped blade for a weed cutter, the sides of the channel being adapted for a portion of their length at one end of the blade to grasp the sides of a handle adapted to rest in the channel, and the material forming the sides of the channel being spread at the other end of the blade and more or less flattened to bring this end to both a transverse and lengthwise curvature or spoon shape, the end of the spoon-shaped bowl being formed into a notched cutting surface.

2. An elongated channel-shaped blade for a weed cutter, having at one end means for securing the blade to a handle which is adapted to rest in the channel and be closely embraced by the sides thereof, and at the other end having a transversely and longitudinally curved spoon-shaped cutter, the cutter proper being formed by spreading the sides of the channel so as to give the cutter the desired width and curvature.

NORMAN E. BROOKE.